United States Patent
Pulz et al.

(10) Patent No.: US 9,361,880 B2
(45) Date of Patent: *Jun. 7, 2016

(54) SYSTEM AND METHOD FOR RECOGNIZING SPEECH WITH DIALECT GRAMMARS

(71) Applicant: Interactions LLC., Franklin, MA (US)

(72) Inventors: Gregory Pulz, Cranbury, NJ (US);
Harry E. Blanchard, Rumson, NJ (US);
Steven H. Lewis, Middletown, NJ (US);
Lan Zhang, Malvern, PA (US)

(73) Assignee: Interactions LLC, Franklin, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/735,035

(22) Filed: Jun. 9, 2015

(65) Prior Publication Data
US 2015/0279362 A1    Oct. 1, 2015

Related U.S. Application Data

(63) Continuation of application No. 14/554,164, filed on Nov. 26, 2014, now Pat. No. 9,082,405, which is a continuation of application No. 14/139,235, filed on Dec. 23, 2013, now Pat. No. 8,924,215, which is a continuation of application No. 12/343,057, filed on Dec. 23, 2008, now Pat. No. 8,635,068.

(51) Int. Cl.
*G10L 15/00* (2013.01)
*G10L 15/18* (2013.01)
*G06F 17/20* (2006.01)
(Continued)

(52) U.S. Cl.
CPC .............. *G10L 15/19* (2013.01); *G10L 15/005* (2013.01); *G10L 15/183* (2013.01); *G10L 15/1822* (2013.01)

(58) Field of Classification Search
USPC .................................. 704/231–257, 270–275
See application file for complete search history.

(56) References Cited

U.S. PATENT DOCUMENTS

| | | |
|---|---|---|
| 5,865,626 A | 2/1999 | Beattie et al. |
| 6,128,482 A | 10/2000 | Nixon |
| 6,343,270 B1 | 1/2002 | Bahl et al. |

(Continued)

OTHER PUBLICATIONS

United States Office Action, U.S. Appl. No. 14/554,164, Feb. 24, 2015, 12 pages.

(Continued)

*Primary Examiner* — Jesse Pullias
(74) *Attorney, Agent, or Firm* — Fenwick & West LLP

(57) ABSTRACT

Disclosed herein are systems, computer-implemented methods, and computer-readable media for recognizing speech. The method includes receiving speech from a user, perceiving at least one speech dialect in the received speech, selecting at least one grammar from a plurality of optimized dialect grammars based on at least one score associated with the perceived speech dialect and the perceived at least one speech dialect, and recognizing the received speech with the selected at least one grammar. Selecting at least one grammar can be further based on a user profile. Multiple grammars can be blended. Predefined parameters can include pronunciation differences, vocabulary, and sentence structure. Optimized dialect grammars can be domain specific. The method can further include recognizing initial received speech with a generic grammar until an optimized dialect grammar is selected. Selecting at least one grammar from a plurality of optimized dialect grammars can be based on a certainty threshold.

20 Claims, 3 Drawing Sheets

(51) Int. Cl.
*G10L 15/19* (2013.01)
*G10L 15/183* (2013.01)

(56) References Cited

U.S. PATENT DOCUMENTS

| | | | |
|---|---|---|---|
| 6,349,281 B1 | 2/2002 | Miyazawa | |
| 6,711,542 B2 | 3/2004 | Theimer | |
| 7,082,392 B1 | 7/2006 | Butler et al. | |
| 7,225,125 B2 | 5/2007 | Bennett et al. | |
| 7,496,511 B2 | 2/2009 | Vora | |
| 7,593,842 B2 | 9/2009 | Rousseau | |
| 8,077,836 B2 | 12/2011 | Gilbert | |
| 8,161,291 B2 | 4/2012 | Mumm | |
| 8,406,382 B2 | 3/2013 | Gilbert | |
| 8,635,068 B2 * | 1/2014 | Pulz | G10L 15/005 704/231 |
| 8,913,720 B2 | 12/2014 | Gilbert | |
| 8,924,215 B2 * | 12/2014 | Pulz | G10L 15/005 704/231 |
| 9,082,405 B2 * | 7/2015 | Pulz | G10L 15/005 |
| 2003/0182131 A1 | 9/2003 | Arnold et al. | |
| 2005/0080632 A1 | 4/2005 | Endo et al. | |
| 2010/0027767 A1 | 2/2010 | Gilbert | |
| 2010/0161336 A1 | 6/2010 | Czahor | |
| 2011/0022387 A1 | 1/2011 | Hager | |
| 2012/0051525 A1 | 3/2012 | Gilbert | |
| 2013/0156166 A1 | 6/2013 | Gilbert | |
| 2015/0055764 A1 | 2/2015 | Gilbert | |

OTHER PUBLICATIONS

United States Office Action, U.S. Appl. No. 14/139,235, Jun. 3, 2014, 9 pages.
United States Office Action, U.S. Appl. No. 12/343,057, Jan. 24, 2012, 14 pages.
United States Office Action, U.S. Appl. No. 12/343,057, Sep. 14, 2011, 15 pages.

* cited by examiner

SYSTEM AND METHOD FOR RECOGNIZING SPEECH WITH DIALECT GRAMMARS

PRIORITY INFORMATION

The present application is a continuation of U.S. patent application Ser. No. 14/554,164, filed Nov. 26, 2014, which is in turn a continuation of Ser. No. 14/139,235 (now U.S. Pat. No. 8,924,215), filed on Dec. 23, 2013, which is in turn a continuation of U.S. patent application Ser. No. 12/343,057 (now U.S. Pat. No. 8,635,068), filed Dec. 23, 2008, the content of which is included herewith in its entirety.

BACKGROUND OF THE INVENTION

1. Field of the Invention

The present invention relates to speech recognition and more specifically to dialect-specific speech recognition.

2. Introduction

Automatic Speech Recognition (ASR) is a part of everyday life. People interact with Interactive Voice Response (IVR) systems when they call a customer service hotline, call a bank, use voice-activated name dialers, and even when they pick up a telephone call from a telemarketing automatic dialer. Modern IVR systems often allow a user to speak their entry data instead of using other input methods, such as touchtone keys or a keyboard, to enter data. When IVRs acquire user input in this way, they typically use a set of utterances or utterance components, called a grammar, representing expected inputs in order to process the information and allow the user to proceed within the IVR system. A directed dialog speech system is one specific example of an IVR system that uses grammars to recognize speech.

A grammar can consist of representations of the expected spoken utterances from a user at a specific point in an application. By knowing what grammar items are expected at a given point in an IVR call, the system or a human administrator tunes the grammars to increase the chance of understanding user speech input. The tuning often includes consideration of numerous external stimuli such as noise background and transmission media. However, callers to an IVR can speak with a wide variety of dialects. Accordingly, what is needed in the art is an improved way to recognize speech based on dialect.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, computer-implemented methods, and tangible computer readable media for recognizing speech. The method includes receiving speech from a user, perceiving at least one speech dialect in the received speech, selecting at least one grammar from a plurality of optimized dialect grammars based on at least one score associated with the perceived speech dialect and the perceived at least one speech dialect, and recognizing the received speech with the selected at least one grammar. Selecting at least one grammar can be further based on a user profile. Multiple grammars can be blended. Predefined parameters can include pronunciation differences, vocabulary, and sentence structure. Optimized dialect grammars can be domain specific. The method can further include recognizing initial received speech with a generic grammar until an optimized dialect grammar is selected. Selecting at least one grammar from a plurality of optimized dialect grammars can be based on a certainty threshold.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
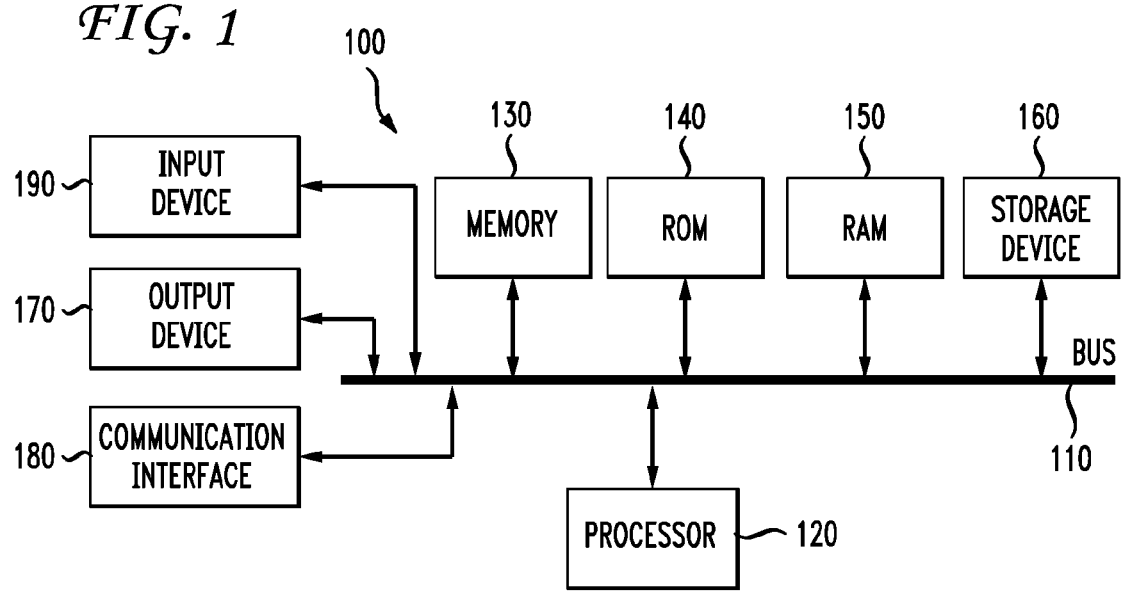
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
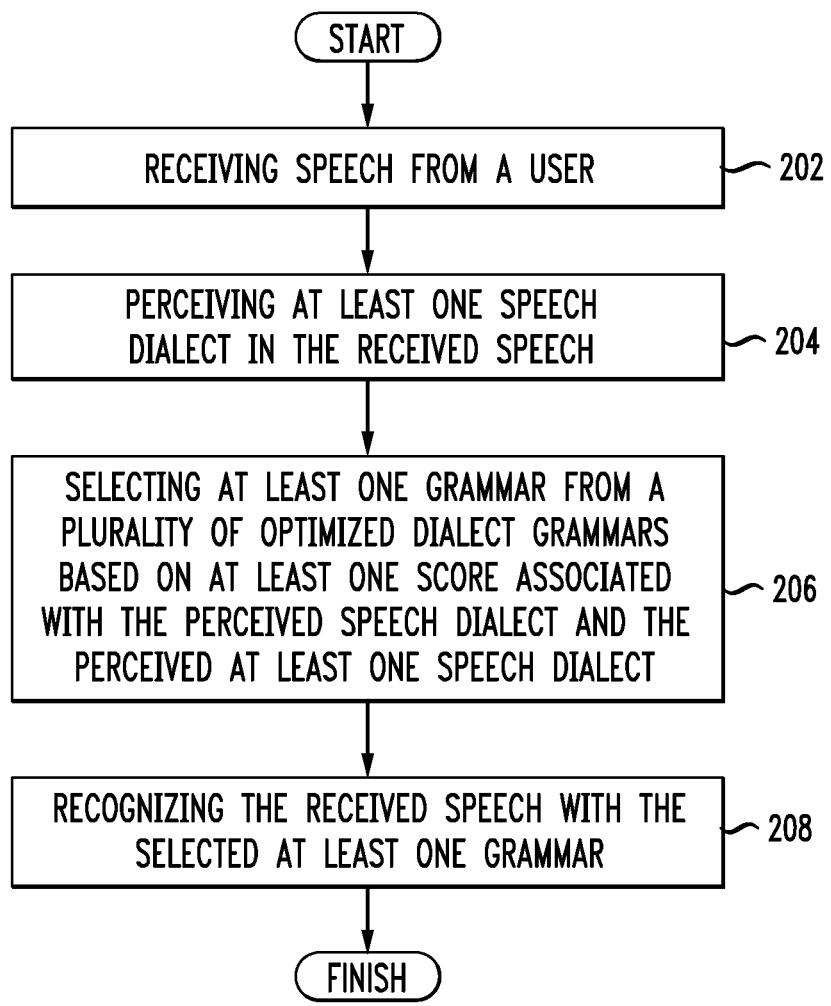
FIG. 2 illustrates an example method embodiment.

Having disclosed some fundamental system elements, the disclosure turns to the exemplary method embodiment as illustrated in FIG. 2. While FIG. 2 demonstrates a method embodiment, the disclosure discusses FIG. 2 in terms of a system configured to practice the method. The system receives speech from a user (202). The system can receive user speech from inputs such as a telephone call, a Voice over IP (VoIP) call, a cellular phone call, a dialog over a computer microphone, or a voice-activated kiosk.

The system scores the received speech based on predefined parameters to perceive at least one speech dialect (204). Predefined parameters can include pronunciation differences, vocabulary, and sentence structure. The system can perceive a speech dialect based on a dynamic or static threshold indicating a similarity to a speech dialect model. The score can contain multiple components indicating different aspects of speech dialects. For example, one component indicates similarity based on sentence structure, another component indicates similarity based on vocabulary, and yet another component indicates similarity based on pronunciation. The system can perceive a dialect by identifying the closest match based on a threshold or the closest two matches. The system can perceive a dialect by identifying all dialects which fall within a similarity threshold.

The system selects at least one grammar from a plurality of optimized dialect grammars based on at least one score and the perceived at least one speech dialect (206). The system can use the score and any or all components of the score to select a dialect. The system can select one or more grammar based on a user profile, a user location, and further based on factors such as threshold similarity and grammar compatibility (some grammars may not operate well in tandem). The system can select a grammar based on a certainty threshold. For example, if the system identifies three candidate grammars, the system can ultimately select the grammars above a threshold of certainty. Optimized dialect grammars can be domain specific. The system then recognizes the received speech with the selected at least one grammar (208).

In one embodiment, the system further recognizes initial received speech with a generic grammar until an optimized dialect grammar is selected. For instance, if the system must recognize speech before selecting an optimized grammar, the system can start recognizing with a generic grammar, even though that generic grammar is likely less suited than an optimized grammar. The generic grammar can essentially serve as a stop-gap until the system identifies and selects a better option grammar.

In one aspect, the system can further personalize the selected at least one grammar based on the received speech, associate the personalized at least one grammar with the user profile, and select the associated personalized at least one grammar when receiving future speech from the user. Often speakers have their own personal dialect that is best served by a unique grammar rather than some combination of numerous grammars. The system can associate such personalized dialects with a user profile, a telephone number, an IP address, or a user identity. For example, when a user calls from her cell phone, the system recognizes the cell phone number and immediately selects that user's personalized grammar. In another aspect, the system employs speaker recognition or a user name/password combination to identify a specific user regardless of where the user is calling from. The system can further adapt the personalized grammar as the user's dialect evolves.

In another aspect, the system can further blend two or more selected grammars and recognize the received speech with the blended two or more selected grammars. The system can blend two or more grammars by averaging grammar elements. The system can blend two or more grammars by combining unaltered grammar elements from a one into another.

In a third aspect, the system can further continuously score the received speech to detect changes away from the selected grammar, and select an updated grammar from the plurality of optimized dialect grammars if the received speech departs beyond a threshold from the selected grammar.

In yet another aspect, the system can further modify the selected grammar(s) based on at least one external stimulus. Different grammars can be tuned to recognize speech using different transmission media. For example, when the system receives user speech over a low bandwidth telephone connection, the recognition characteristics are much different than user speech received over a high definition VoIP connection. Different grammars tuned to the same user dialect can be tuned to make the most of peculiarities of transmission media.

The system can continuously perform all or part of the process depicted in FIG. 2. For example, if the person speaking passes the telephone to another person, the system can detect another dialect and select another grammar for the new person. Or if the person starts talking with a different accent, perhaps sliding in to a childhood accent, the system can dynamically detect the changing dialect and select another one after crossing the threshold of certainty for the new dialect.

Figure 3:
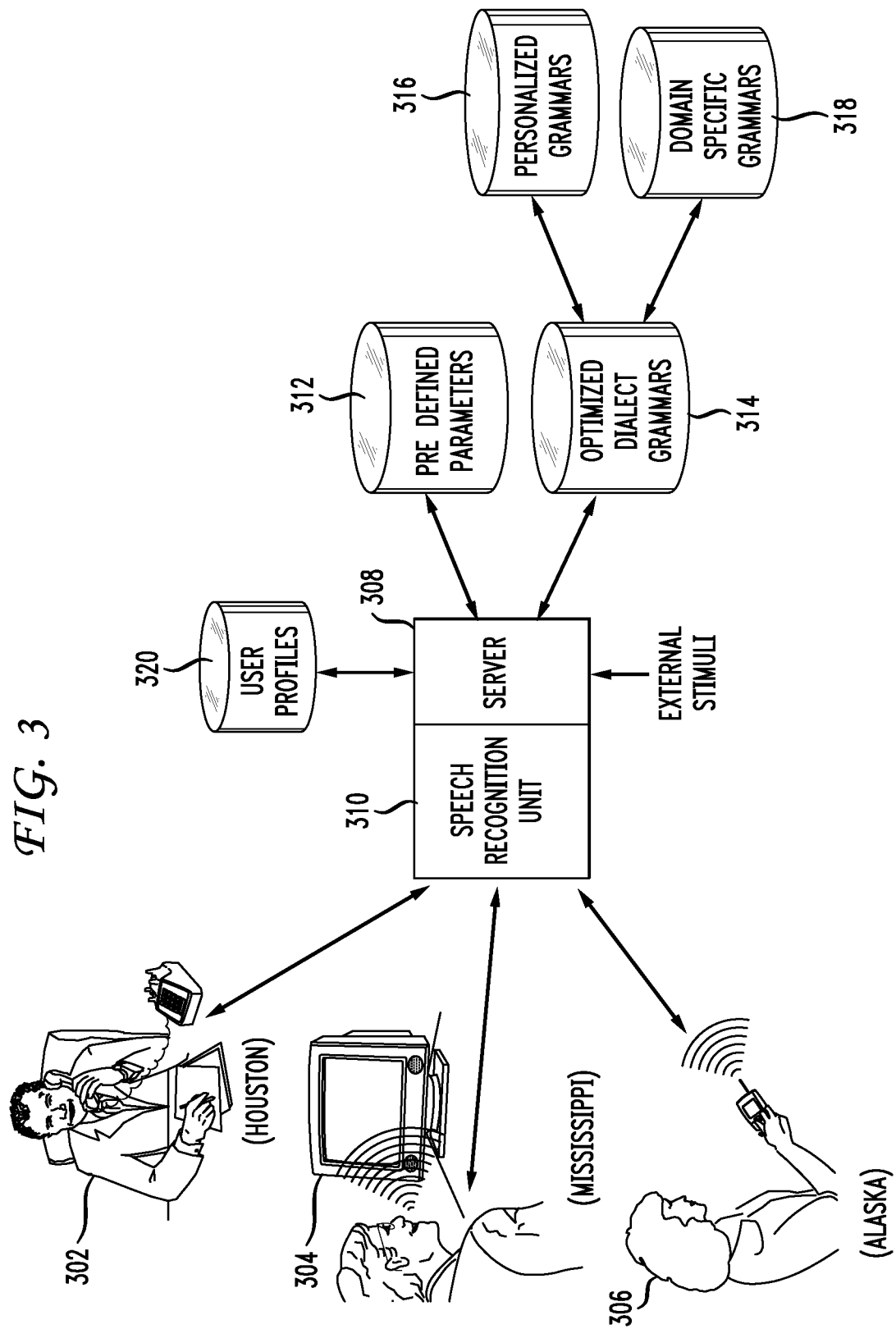
FIG. 3 illustrates an example system for recognizing speech using dialect-based grammars.

FIG. 3 illustrates an example system configured to recognize speech using dialect-based grammars. The system includes a server 308 which interacts with multiple users 302, 304, 306. Users communicate with the server 308 using natural language. The server 308 includes a speech recognition unit 310 to understand user utterances. Users can communicate with the server 308 using a traditional wired telephone, VoIP, cellular phone, network connected computer having a microphone and a speaker, and other suitable devices.

The server scores speech based on predefined parameters 312 to perceive a speech dialect of the speech. The server selects one or more grammars from a database of optimized dialect grammars 314 that best correspond to the perceived speech dialect. For example, if a caller is from Italy and is a non-native English speaker, the server perceives an Italian speech dialect and selects an optimized dialect grammar for Italian. As another example, if a caller grew up in New Jersey but now lives in Alabama, his speech can include elements of both dialects. The server perceives these two dialectal influences and selects an optimized dialect grammar for both. Sometimes the system can encounter subtle differences between regional dialects which are difficult to resolve based on a short speech sample. For this or other reasons, the server 308 can gather location information of the speaker directly transmitted from the various communication devices, such as Automatic Number Identification (ANI). When using a non-traditional communications device, such as a VoIP phone, the phone can send additional information to the server 308 or the server 308 can look up, deduce, or infer location information about the speaker. The system can consider location information when selecting an optimized dialect grammar. For example, if the system is equally certain about a grammar from Louisiana and a grammar from Texas, the area code from whence the user is calling can provide an additional information point upon which the server 308 can base a decision.

When the system encounters a user or group of users sharing a dialect, the system can store a personalized grammar 316 tailored to that user or group of users. As the system encounters more and more speech from that user or group of users, the personalized grammar can evolve and adapt. Often, such personalized grammars are associated with a user profile 320. Indeed, identifying a user profile or a user can automatically trigger a personalized grammar 316. The system can automatically generate and retrieve user profiles based on some unique identifier, such as phone number or user name and password.

In some cases, a user speaks with a different accent depending on the subject matter they are speaking about. For example, an accountant who studied accounting in New York City may speak about accounting matters with a New York accent while speaking about other subjects without a New York accent. The system 308 can retrieve domain-specific grammars 318 to better recognize speech from such users. Domain specific grammars 318 can be separate from personalized grammars 316, as shown, or combined/integrated as part of personalized grammars 316. The server 308 can modify any selected grammar to adapt to the current speaker. Further, the server 308 can take into account external stimuli 322 when selecting and/or adapting a selected grammar. Some examples of external stimuli are noise background, transmission medium, available bandwidth, and available processing power to devote to speech recognition. After the server 308 selects a grammar or grammars, the server 308 passes the grammar to the speech recognition unit 310 to recognize received user speech.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to any speech recognition system. Those skilled in the art will readily recognize various modifications and changes that may be made to the present invention without following the example embodiments and applications illustrated and described herein, and without departing from the true spirit and scope of the present invention.

What is claimed is:

1. A method comprising:
    for each dialect in a plurality of dialects identified within a speech utterance, selecting, via a processor, a corresponding dialect grammar, to yield a plurality of dialect grammars;
    blending, via the processor, the plurality of dialect grammars, to yield a blended dialect grammar; and
    recognizing speech utterances using the blended dialect grammar.

2. The method of claim 1, wherein selection of the corresponding dialect grammar is based on a similarity of the dialect to the corresponding dialect grammar, wherein the similarity is based on phoneme usage in the dialect and the corresponding dialect grammar.

3. The method of claim 2, wherein selection of the corresponding dialect grammar is further based on a user profile.

4. The method of claim 3, wherein the user profile is associated with a grammar personalized for a user associated with the user profile and the speech utterance.

5. The method of claim 1, wherein selection of the corresponding dialect grammar is based on a user location.

6. The method of claim 1, wherein the blending of the plurality of dialect grammars further comprises blending elements of each corresponding dialect grammar in the plurality of dialect grammars based on a respective score of each corresponding dialect grammar.

7. The method of claim 1, further comprising recognizing initial speech with a generic grammar until the blended dialect grammar is generated.

8. The method of claim 1, wherein the plurality of dialect grammars are domain specific.

9. The method of claim 1, wherein each dialect grammar of the plurality of dialect grammars is associated with parameters comprising one of vocabulary and sentence structure.

10. A system comprising:
    a processor; and
    a computer-readable storage medium having instructions stored which, when executed by the processor, result in the processor performing operations comprising:
        for each dialect in a plurality of dialects identified within a speech utterance, selecting a corresponding dialect grammar, to yield a plurality of dialect grammars;
        blending the plurality of dialect grammars, to yield a blended dialect grammar; and
        recognizing speech utterances using the blended dialect grammar.

11. The system of claim 10, wherein selection of the corresponding dialect grammar is based on a similarity of the dialect to the corresponding dialect grammar, wherein the similarity is based on phoneme usage in the dialect and the corresponding dialect grammar.

12. The system of claim 11, wherein selection of the corresponding dialect grammar is further based on a user profile.

13. The system of claim 12, wherein the user profile is associated with a grammar personalized for a user associated both with the user profile and the speech utterance.

14. The system of claim 10, wherein selection of the corresponding dialect grammar is based on a user location.

15. The system of claim 10, wherein the blending of the plurality of dialect grammars further comprises blending elements of each corresponding dialect grammar in the plurality of dialect grammars based on a respective score of each corresponding dialect grammar.

16. The system of claim 10, the computer-readable storage medium having additional instructions stored which, when executed by the processor, result in operations comprising recognizing initial speech with a generic grammar until the blended dialect grammar is generated.

17. The system of claim 10, wherein the plurality of dialect grammars are domain specific.

18. The system of claim 10, wherein each dialect grammar of the plurality of dialect grammars is associated with parameters comprising one of vocabulary and sentence structure.

19. A computer-readable storage device having instructions stored which, when executed by a computing device, result in the computing device performing operations comprising:
    for each dialect in a plurality of dialects identified within a speech utterance, selecting a corresponding dialect grammar, to yield a plurality of dialect grammars;
    blending the plurality of dialect grammars, to yield a blended dialect grammar; and
    recognizing speech utterances using the blended dialect grammar.

20. The computer-readable storage device of claim 19, wherein selection of the corresponding dialect grammar is based on a similarity of the dialect to the corresponding dialect grammar, wherein the similarity is based on phoneme usage in the dialect and the corresponding dialect grammar.

* * * * *